United States Patent
Pai et al.

(10) Patent No.: US 7,580,938 B1
(45) Date of Patent: Aug. 25, 2009

(54) METHODS AND APPARATUS FACILITATING EFFICIENT DISPLAY OF DATA

(75) Inventors: Pramod K. Pai, Karnataka (IN); Steven S. Teng, Littleton, MA (US); Ethan D. Roberts, Natick, MA (US)

(73) Assignee: EMC Corporation, Hopkinton, MA (US)

( * ) Notice: Subject to any disclaimer, the term of this patent is extended or adjusted under 35 U.S.C. 154(b) by 242 days.

(21) Appl. No.: 11/479,557

(22) Filed: Jun. 29, 2006

(51) Int. Cl.
*G06F 17/00* (2006.01)
*G06F 17/30* (2006.01)
*G06F 3/048* (2006.01)
*G06F 17/20* (2006.01)
*G06F 17/21* (2006.01)
*G06F 17/24* (2006.01)
*G06F 17/25* (2006.01)
*G06F 17/26* (2006.01)
*G06F 17/27* (2006.01)
*G06F 17/28* (2006.01)
*G06T 1/00* (2006.01)

(52) U.S. Cl. .................. 707/100; 345/418; 715/853; 715/205; 707/10

(58) Field of Classification Search ............ 707/100, 707/10; 345/418; 715/853, 205
See application file for complete search history.

(56) References Cited

U.S. PATENT DOCUMENTS

| 6,314,424 | B1 * | 11/2001 | Kaczmarski et al. | 707/10 |
| 2004/0243938 | A1 * | 12/2004 | Weise et al. | 715/526 |
| 2004/0243945 | A1 * | 12/2004 | Benhase et al. | 715/853 |

* cited by examiner

*Primary Examiner*—James Trujillo
*Assistant Examiner*—Bruce M Moser
(74) *Attorney, Agent, or Firm*—Chapin IP Law, LLC; Barry W. Chapin, Esq.

(57) ABSTRACT

A display function associated with a storage area network manager process initiates display of a respective hierarchical tree including elements of a storage area network. The hierarchical tree can include parent nodes (representing resources associated with the storage area network) that can be selectively expanded by a user for purposes of viewing sub-information associated with a respective parent resource in the tree. When a user clicks or selects a specific entry in the tree to expand it, a query object triggered by the selection notifies a respective processing function of managed objects (e.g., specific objects in a database) that are related to the selected storage area network resources. The respective processing function utilizes attribute information depending on a type of managed object in a database for purposes of reducing an amount of object data that must be retrieved from the database and identifying pertinent sub-information to update the hierarchical tree.

19 Claims, 7 Drawing Sheets

METHODS AND APPARATUS FACILITATING EFFICIENT DISPLAY OF DATA

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to an increased need for storage by integrating high capacity data storage systems, data communications devices (e.g., switches), and computer systems (e.g., host computers or servers) into networks called "storage networks" or "Storage Area Networks" (SANs.)

In general, a storage area network is a collection of data storage systems that are networked together via a switching fabric to a number of host computer systems operating as servers. The host computers access data stored in the data storage systems on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

One way of managing resources associated with the storage area network is to maintain so-called managed objects. In general, a managed object is a software entity that defines a corresponding hardware or software resource of the storage area network. The network administrator utilizes the managed objects to identify different resources associated with the storage area network.

A set of managed objects can be used to form an object hierarchy. For example, a "top level" object (e.g., an object at a highest tier) associated with the hierarchy CAN represent a particular storage resource (e.g., storage system) in the storage area network. Objects in the hierarchy beneath the "top level" object represent hardware or software resources of the storage area network associated with the particular storage resource. Accordingly, a hierarchy of managed objects such as a tree can define specific resources and corresponding sub-resources in the storage area network associated with a respective storage system.

A storage administrator typically configures the storage area network to include multiple storage systems by creating and maintaining multiple managed objects storing information associated with corresponding storage area network resources. As indicated above, each branch in an object hierarchy can represent a corresponding unique storage system (e.g., portion of resources) associated with the storage area network. Clicking on "expand" icons associated with a resource in the hierarchical tree enables a respective user to view sub-information associated with the selected resource. For example, a user can click on a branch in a hierarchical tree such as an entry representing a Symmetrix™ storage system. In response to such a selection, a respective display process initiates expansion of a hierarchical tree displayed to the user to include sub-information such as a listing of mapped and unmapped devices associated with the selected storage system.

SUMMARY

Conventional techniques for initiating a display of a hierarchical tree including a listing of respective storage area network resources suffer from a number of deficiencies. For example, conventional techniques require retrieval of a set of managed object information associated with one or more resources in their entirety in order to subsequently identify and display sub-information associated with the selected resource in a corresponding hierarchical tree. Accordingly, if a user happens to select a storage system in a hierarchical tree having many corresponding sub-resources, a processing function must access each managed object beneath or referenced by a managed object (e.g., a data structure storing detailed information) associated with the selected resource in the hierarchical tree before updating the hierarchical tree. The size of one or more child managed objects referenced by a parent managed object each can be very large. Additionally, there may be many managed objects that must be retrieved from a respective database (in their entirety) in order to successfully expand a respective hierarchical tree in response to user input. Accordingly, expansion of a respective hierarchical tree can require large amounts of memory and processing power.

As an example, assume that a "top level" or a parent object (e.g., a managed object representing a storage area network resource) in a respective object hierarchy includes references to 30,000 different instances of corresponding lower level objects (e.g., other storage area network resources). Each of the instances has a respective managed object (e.g., object data) stored in a respective database. Among other things, the managed objects in the database define an interrelationship associated with the resources in the storage area network environment. Only a small portion of information in a respective managed object in the database is typically needed for purposes of expanding or updating a respective hierarchical tree.

In this example, assume that a user decides to view instances (e.g., resource entries) below the parent object in a respective hierarchical tree by clicking on the parent object (e.g., a parent resource or corresponding icon) in the hierarchical tree. According to conventional techniques, in such a case, a processing function would have to access a respective managed object associated with each sub-object in the tree before updating a display of the hierarchical tree to expand the hierarchical tree to include the 30,000 resource instances beneath the expanded parent object. Accordingly, a user may need to wait an inordinate amount of time for the hierarchical tree to be updated after expansion of a branch or node of the hierarchical tree.

Techniques discussed herein deviate with respect to conventional applications such as those discussed above as well as other techniques known in the prior art. In particular, embodiments herein enable efficient generation and/or updating of a respective hierarchical tree upon expansion of a resource in the hierarchical tree.

More specifically, in one embodiment, a display function associated with a storage area network manager process initiates display of a respective hierarchical tree including elements of a storage area network. The hierarchical tree includes parent nodes (e.g., folders or branches of information associated with an element of the storage area network) that can be expanded by a user for purposes of viewing sub-information associated with a respective parent resource in the tree.

According to one embodiment, an example of a parent resource in the hierarchical tree is a specific storage system (e.g., type, configuration, etc.) associated with a respective storage area network. When the user clicks on the specific storage system to expand it, a processing function retrieves information from a respective database to identify what information to display beneath the selected storage system as related one or more storage area network resources.

Execution of the command (e.g., clicking on a '+' icon in the hierarchical tree) to expand a parent resource triggers a query object to initiate expansion of the hierarchical tree. For example, upon selection of an expansion icon in the hierarchical tree, a corresponding query object communicates with a processing function that, in turn, accesses a respective database of related managed objects to identify how to expand the hierarchical tree based on the user's selection.

The query object provides selection criteria such as identities of specific managed objects in the database having relevant information for updating the hierarchical tree to the processing function (e.g., a display manager). Determination of attributes based on the selection criteria provided by the query object enables the processing function to narrow a respective database query because the object attributes (e.g., types of information from the managed objects) narrow an amount of and/or specifically identify object data that must be retrieved from the database for purposes of updating the hierarchical tree. In one embodiment, the identified attributes enable the processing function to retrieve object data for updating an expanded portion of the hierarchical tree to include appropriate name, status, interrelationship, icon type, etc.

Without use of the selection criteria provided by the query object and identifying the respective attributes based on a respective type of object to be accessed, the processing function would have to retrieve all managed objects associated with the parent resource, store the retrieved information in memory, and process (e.g., filter) the retrieved information in order to update the hierarchical tree.

According to techniques herein, communications with or use of the query object, use of corresponding selection criteria, and identification of corresponding attribute information based on the selection criteria enables the processing function to reduce an overall amount of information that must be retrieved from the database in order to update (e.g., appropriately expand) the hierarchical tree. For example, without the selection criteria and identification of the attributes, the processing function would have to retrieve and process all the managed objects associated with the parent instance in the tree, identify a respective interrelationship amongst respective storage area network resources, and expand the hierarchical tree accordingly. The selection criteria and/or identification of display attributes according to embodiments herein can provide a filtering capability enabling the processing function to retrieve only relevant (e.g., a portion of) information associated with the related managed objects that needs to be retrieved from the database.

Note that in one embodiment, the processing function uses the information retrieved from the database to create one or more (display) presentation objects that are used for purposes of displaying the hierarchical tree on a respective display screen.

The above technique can be expanded according to other embodiments. For example, prior to receiving the selection criteria from the query object, the processing function can receive an initial query from the query object, retrieve appropriate information from the database associated with the initial query, provide the information retrieved from the database back to the query object.

In certain situations, the query object may be unable to specify the exact selection criteria for use in or conversion into a database query (e.g., Toplink™ query), it specifies certain attributes along with the selection criteria. Note that these attributes do not have any relation to the attributes required to construct the display object. The attributes requested by the query object are added into the query and fired. Once the result set is obtained, for each result, the set of retrieved attributes is sent again to the query object. Now, the query object has a chance to examine the actual values and decide if the result needs to be shown (this can be considered as a run-time selection).

As an example, it has been found that computing Volume-AccessRights for a given device involves complex logic, which is not very easy to represent as a database query. However, the attributes of the device required for this computation are static and few in number. This becomes an ideal use case for the concept discussed above. For example, the query object along with the selection criteria can specify the list of attributes required to compute corresponding Volume Access Rights for a device. After the query executes, the processing function passes on each result in the result set. The query object uses the retrieved attribute values to generate the Volume Access Right for the device and, if found to not match the required selection criteria, inform the processing function to skip the result. Using this approach, runtime filtering (based on the retrieved data) can be achieved. In one embodiment, note that computed Volume Access Rights can be used simply to decide if a corresponding result (or a row in the resultset) needs to be displayed or not. It does not denote whether the user in question has the necessary rights to execute the query object or not.

Accordingly, embodiments herein include a processing function that receives selection criteria in response to issuance of a command to expand a resource instance in a respective hierarchical tree of storage area network resources. The selection criteria can identify managed objects having information associated with other storage area network resources to be listed in the hierarchical tree. As discussed above, the processing function utilizes the selection criteria to identify attributes of object data required to update the hierarchical tree. For example, the processing function identifies attributes of relevant object data to retrieve from the database based on a type of managed object or corresponding storage area network resource object to be accessed. The processing function then accesses portions of a database as specified by the identified attributes for purposes of expanding the resource instance in the respective hierarchical tree to include sub-resource information associated with the expanded resource instance. In one embodiment, the processing function utilizes the accessed portions of the database to generate so-called display presentation objects defining how to present expanded portions of the hierarchical tree in response to the issuance of a respective expansion command.

According to other embodiments, reception of a command to expand a parent resource instance in a respective hierarchical tree of storage area network resources triggers execution of a respective query object. The triggered query object notifies a display management processing function to update the hierarchical tree to include child resource instances associated with the expanded resource instance. Additionally, the query object provides selection criteria associated with the command to the display management processing function for purposes of enabling the display management processing function to identify specific display attributes required to update the hierarchical tree and display child resource instances associated with the parent resource instance in the hierarchical tree.

In addition to the embodiments discussed above, other embodiments herein include a computerized device (e.g., a host computer, workstation, etc.) configured to support the aforementioned method/operations to carry out an action such as expansion of a respective hierarchical tree of storage area network resource. In such embodiments, the computerized device or application includes a memory system, a processor (e.g., a processing device), a display, and an interconnect. The interconnect supports communications among the display, the processor, and the memory system. The memory system is encoded with an algorithm that, when executed on the processor, produces a process that carries out modification of the hierarchical tree as discussed above.

Yet other embodiments disclosed herein include software programs to perform the method embodiment and operations summarized above and disclosed in detail below under the heading Detailed Description. More particularly, a computer program product (e.g., a computer-readable medium) including computer program logic encoded thereon may be executed on a computerized device to facilitate carrying out modifications to a respective hierarchical tree of storage area network resources as explained herein. The computer program logic, when executed on at least one processor in a respective computing system, causes the processor to perform the operations (e.g., the methods, algorithm, technique) indicated herein. Such embodiments are typically provided as software, code, and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein.

One more particular configuration herein is directed to a computer program product that includes a computer readable medium having instructions stored thereon for purposes of facilitating display of a hierarchical tree. The instructions, when carried out by a processor of a respective computer device, cause the processor to perform the steps of: i) receiving selection criteria in response to issuance of a command to expand a resource instance in a respective hierarchical tree of storage area network resources; ii) utilizing the selection criteria to identify a set of one or more object attributes of information in a respective one or more managed objects that are to be retrieved for purposes of updating the hierarchical tree; iii) accessing portions of the database in accordance with the identified attributes and selection criteria to expand the resource instance in the respective hierarchical tree to include sub-resource information associated with the expanded resource instance; and iv) utilizing the accessed portions of the database to generate corresponding display presentation objects defining how to present expanded portions of the hierarchical tree for viewing the sub-resource information on a respective display screen. Other embodiments of the present disclosure include software programs to perform any of the method embodiment steps and operations summarized above and disclosed in detail below.

As discussed, techniques herein are well suited for use in applications enabling a respective one or more user to expand and view contents of a respective hierarchical tree of storage area network resources. However, it should be noted that embodiments herein are not limited to use in such applications.

It should be understood that the system herein can be embodied as a software program or as a software program operating in conjunction with corresponding hardware. Example embodiments of the present application may be implemented in conjunction with EMC's Control Center software application that provides graphical management functionality for storage area network resources and in computerized devices that operate the Control Center software. Control Center software is manufactured by EMC Corporation of Hopkinton, Mass., USA.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to embodiments herein, a display function associated with a storage area network manager process initiates display of a respective hierarchical tree including elements of a storage area network. The hierarchical tree can include parent resource entries. The parent resource entries in the hierarchical tree can be selectively expanded by a user for purposes of viewing sub-information associated with a respective parent resource in the tree. For example, when a user clicks or selects a specific resource entry in the tree to expand it, a so-called query object (e.g., processing function) triggered by the user's selection notifies another processing function of selection criteria such as managed objects (e.g., specific objects in a database) that are related to a selected (e.g., a resource being expanded) storage area network resource in the hierarchical tree. The processing function utilizes a mapping to identify specific portions of the managed objects to retrieve from the database for purposes of updating the hierarchical tree. That is, rather than merely notifying the processing function of a set of managed objects related to the parent node in the hierarchical tree that must be retrieved in their entirety in order to update the hierarchical tree, the processing function receiving the selection criteria identifies attributes information to narrow down the amount of information the processing function must retrieve from the database in order to appropriately update the hierarchical tree. Updating the hierarchical tree 160 according to embodiments herein is therefore much quicker than conventional methods.

Figure 1:
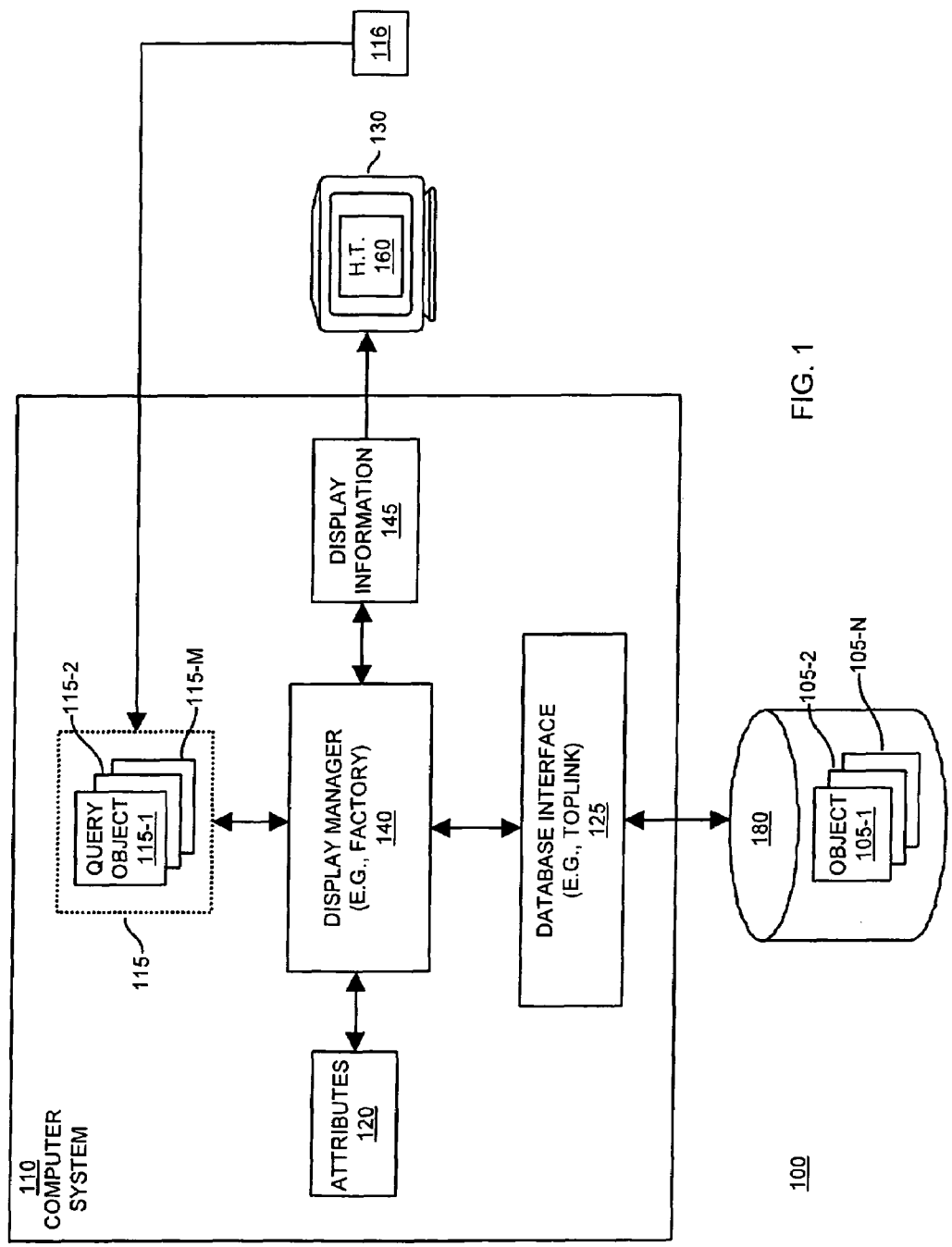
FIG. 1 is a diagram illustrating management of a hierarchical tree according to an embodiment herein.

FIG. 1 is a diagram illustrating a processing environment 100 in which display manager 140 of computer system 110 generates display information 145 to produce hierarchical tree 160 on display screen 130 according to embodiments herein.

As shown, processing environment 100 includes computer system 110, corresponding display screen 130, one or more peripheral device 116, and repository 180. Computer system 110 includes query objects 115 (e.g., query object 115-1, query object 115-2, . . . , query object 115-M), display manager 140, attributes 120, display information 145, database interface 125, and display information 145. Repository stores object data in corresponding objects 105 (e.g., object 105-1, object 105-2, . . . , object 105-N). Display screen 130 displays hierarchical tree 160 of, for example, resources in a corresponding storage area network environment.

In the context of a general embodiment herein, a respective user such as storage area network administrator provides input via peripheral device 116 (e.g., a handheld computer mouse, keyboard, etc.) to view hierarchical tree 160 (e.g., a listing of resources in a respective storage area network environment) on display screen 130. A user can click or select a respective entry in hierarchical tree 160 to be expanded. In one embodiment, the user's selection initiates execution of a corresponding query object 115. In furtherance of updating the hierarchical tree 160 upon receipt of input, a triggered query object 115 communicates with display manager 140 and provides display manager 140 with selection criteria (e.g., an indication of a respective set of objects that have information that needs to be fetched from repository 180) for purposes of updating the hierarchical tree 160.

As an example, the query object 115 notifies the display manager 140 that a user (or other control mechanism) has provided input to update the hierarchical tree 160. In response to the notification, the display manager 140 initiates a query to the query object 115 of what types of objects need to be fetched from the repository 180.

Thereafter, the triggered query object notifies the display manager 140 of selection criteria such as identification of particular managed objects having information to be retrieved from repository 180. In one embodiment, the selection criteria can be used to identify one or more specific resource types associated with corresponding objects having data to be retrieved from repository 180.

Prior to retrieval of corresponding object information from repository 180, the display manager 140 identifies corresponding attributes 120 indicating specific object information (e.g., a subset of object data in a respective object 105) required to update the hierarchical tree 160. In one embodiment, the display manager 140 learns of specific types associated with each object in repository 180 that must be accessed as specified by the query object. The display manager 140 uses the type information to map to corresponding attributes 120 that are to be used to more particularly focus or narrow down a particular set of object data to be retrieved from repository 180 to update the hierarchical tree 160.

Display manager 140 forwards the selection criteria and/or identified attribute information to database interface 125. In turn, database interface 125 (e.g., TopLink™) creates one or more respective queries (e.g., SQL-based queries) to repository 180 (e.g., a relational database) to retrieve respective object data. The database interface 125 retrieves information from repository 180 and forwards the retrieved object data to display manager 140. Display manager 140 creates display information 145 (e.g., presentation objects) for purposes of updating hierarchical tree 160 on display screen 130.

Thus, according to embodiments herein, the display manager 140 can initiate retrieval of a sub-portion of data associated with one or more specified managed objects in repository 180 rather than retrieve all specified managed objects in their entirety to update the hierarchical tree 160.

In one embodiment, in accordance with the general discussion above, the display manager 140 accepts a corresponding one of query objects 115 triggered by selection of a corresponding resource in the hierarchical tree 160. The triggered query object specifies the name of a managed object set it will represent. The triggered query object can include the corresponding criteria to filter out the data objects that it requires to be retrieved from repository 180. The display manager 140 obtains the name (e.g., identifiers such as names) of the required managed object (or managed objects) from the query and identifies a corresponding set of one or more so-called presentation objects to be constructed for inclusion as display information 145 stored in memory.

Next, the display manager 140 starts building an appropriate query (e.g., a Toplink™ query) to fetch the required subset of data required to construct the display information (e.g., presentation objects). To build the query, the display manager 140 first identifies a set of corresponding standard attributes from attributes 120 required for presentation of object data in the corresponding hierarchical tree 160 and adds these attributes to the query. In one embodiment, the display manager verifies the existence of these attributes by using a data object descriptor provided by the database interface 125 (e.g., Toplink™ application). Use of a relational table—data object mapping tool further enables use of the descriptors rather than directly specifying table columns in a query. This provides loose coupling between the display manager 140 and the database interface 125.

Next, the display manager 140 utilizes the triggered query object to identify selection criteria that is added to the query generated by database interface 125. Use of the selection criteria ensures that the database interface fetches the data only for those objects for which the presentation objects need to be constructed. Use of the selection criteria and query objects 115 ensures minimal maintainability since the code carrying out the execution gets localized.

As discussed above, the display manager 140 identifies which of attributes 120 of object data in repository 180 it needs to create display information 145 (e.g., presentation objects) and update the hierarchical tree 160. After identification, the display manager 140 provides the set of attributes it requires to construct the presentation objects. Since the display manager 140 constructs display information 145, having the display manager 140 specify the required attributes ensures localization of code and ease of maintaining code.

A query executed by database interface 125 can be executed in a very generic fashion to fetch the appropriate object data. A result set can be iterated upon, and for each result returned, a so-called kit object can be constructed which contains the retrieved and stateful information from repository 180.

The display manager 140 receives the kit object from the database interface 125. The display manager 140 uses the kit object to construct the display information 145, which can be considered "light weight" since the presentation objects are a scaled down amount of object data that would otherwise need to be retrieved from repository 180 to update the hierarchical tree 160 if no attributes were used to identify specific portions of stored managed objects to retrieve from repository 180.

As discussed above, an advantage of the techniques herein is to avoid reconstruction of entire managed objects describing corresponding resources in a storage area network environment. In other words, conventional methods involved retrieving object data and recreating a managed object in its entirety for purposes of updating a hierarchical tree of storage area network resources. Note that a large portion of a corresponding managed object representing a storage area network resource typically includes a bulk of object data that is not needed to update the hierarchical tree 160. According to embodiments herein, use of the identified attributes enables the display manager 140 to retrieve only a portion of object data associated with one or more managed objects for purposes of updating the hierarchical tree 160.

In addition, a normal sequence of caching each managed object and other such housekeeping and operations are avoided. This is advantageous because, when a large number of objects are involved (e.g., the user selects to expand on a resource in the storage area network environment having many sub-resources to be displayed in the expanded portion of the hierarchical tree 160), the probability that the user would require to see all of the sub-resources in a single request is very low, if not nil. By avoiding complete object construction and caching, the time to load memory is reduced. Also, when a respective user requests information on specific objects, they are fetched and cached "on demand" and only required objects are actually fetched and stored in local memory of computer system 110.

According to one embodiment, the display manager 140 can initiate retrieval of object data on behalf of a triggered query object prior to actual expansion of the hierarchical tree 160. For example, the display manager 140 can receive a query from a triggered query object (e.g., that has been triggered in response to the issuance of the command) to access information in the repository 180. In response to the query from the query object, the display manager 140 can initiate access of object information from the repository 180 (e.g., database) on behalf of the triggered query object 115. The display manager 140 then forwards the accessed object information to the triggered query object.

In certain situations, the query object 115 may be unable to specify the exact selection criteria for use in or conversion into a database query (e.g., Toplink™ query), it specifies certain attributes along with the selection criteria. Note that these attributes do not have any relation to the attributes required to construct the display object. The attributes requested by the query object 115 are added into the query and fired. Once the result set is obtained, for each result, the set of retrieved attributes is sent again to the query object 115. Now, the query object 115 has a chance to examine the actual values and decide if the result needs to be shown (this can be considered as a run-time selection).

As an example it has been found that computing the Volume Access Rights for a given device involves complex logic, which is not very easy to represent as a database query. However, the attributes of the device required for this computation are static and few in number. This becomes an ideal use case for the concept discussed above. For example, the query object 115 along with the selection criteria can specify the list of attributes required to compute corresponding Volume Access Rights for a device. After the query executes, the processing function (e.g., display manager 140) passes on each result in the result set. The query object uses the retrieved attribute values to generate the Volume Access Right for the device and, if found to not match the required selection criteria, inform the processing function to skip the result. Using this approach, runtime filtering (based on the retrieved data) can be achieved. In one embodiment, note that computed Volume Access Rights can be used simply to decide if a corresponding result (or a row in the resultset) needs to be displayed or not. It may not denote whether the user in question has the necessary rights to execute the query object or not.

Figure 2:
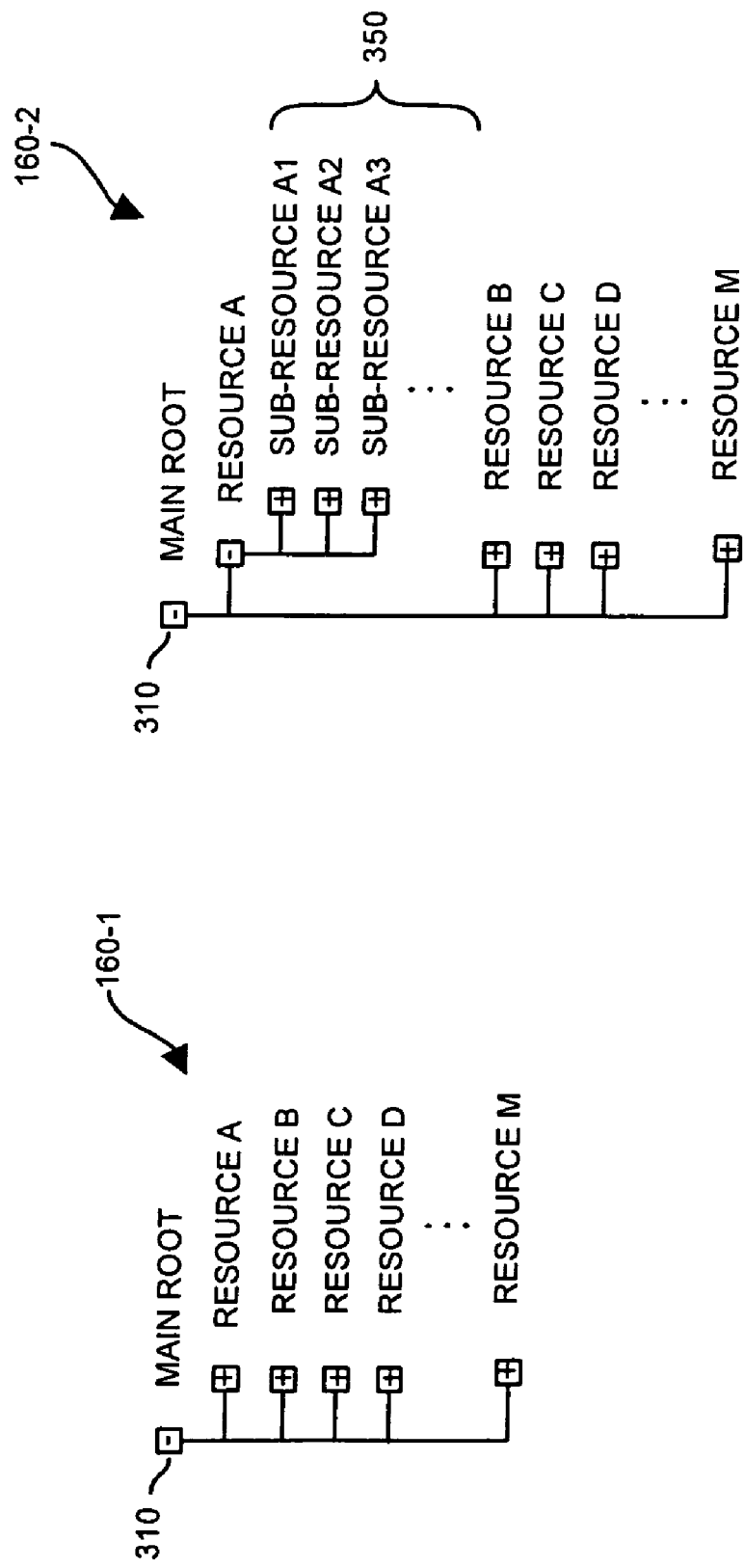
FIG. 2 is a diagram illustrating a mapping of different object types to sets of attributes according to embodiments herein.

FIG. 2 is a diagram of hierarchical tree 160 before and after initiating an expand function according to embodiments herein.

In accordance with FIG. 1 as discussed above, each respective storage area network resource displayed in a respective hierarchical tree 160 of FIG. 2 can have a corresponding managed object stored in repository 180 (e.g., a relational database). To create (or change an appearance of) the hierarchical tree 160 of storage area network resources in response to a respective user selection, display manager 140 in conjunction with the database interface 125 (e.g., one or more processing functions) accesses repository 180 (e.g., a respective managed object database) for information associated with the corresponding resources to be included in the hierarchical tree 160. For example, when a user clicks on a respective branch or icon of the hierarchical tree 160 to expand the hierarchical tree 160 to include further details associated with a corresponding storage system in the storage area network, a processing function must first retrieve at least a portion of object data from respective managed objects in the repository 180 for each resource to be displayed beneath the expanded branch of the tree prior to displaying the listing of the sub-resources such as mapped and unmapped devices associated with an expanded entry (e.g., a storage system entry) in the hierarchical tree 160. As discussed above, the identified attributes enable the display manager 140 to identify specific portions of the managed objects to retrieve from repository 180.

In the present example, assume that a given user initially views hierarchical tree 160-1 including resource A, resource B, . . . , and resource M. In one embodiment, resource A represents a first storage system associated with a respective storage area network environment, resource B represents a second storage system, resource C represents a third storage system, and so on.

As shown in FIG. 2, selection of resource A (e.g., as a result of a user clicking on the + sign associated with resource A) in hierarchical tree 160-1 triggers execution of a respective query object 115 in computer system 110. The corresponding executed query object 115 provides display manager 140 with an identification of corresponding objects that must be accessed to update the hierarchical tree 160-1 to produce hierarchical tree 160-2. Based on a type of sub-resources (or corresponding type of objects) that must be accessed from repository 180, the display manager 140 identifies attributes 120 for the object (or objects) that must be accessed. In this example, assume that the display manager 140 learns that sub-resource A1, A2, A3, . . . shall be displayed underneath resource A in hierarchical tree 160-2. The display manager 140 identifies attributes such as names, status, icon type, interrelationship information, etc., to be retrieved from objects in repository 180 associated with sub-resource A1, sub-resource A2, sub-resource A3, etc.

As discussed above, the display manager 140 communicates these identified attributes to database interface 125 so that the database interface 125 is able to retrieve a portion of object data associated with the target objects in repository 180 rather than the target objects in their entirety. In other words, the display manager 140 utilizes the identified attributes to initiate retrieval of relevant object data needed to update the hierarchical tree 160-1 but not all of the object data associated with the corresponding sub-resources. Accordingly, embodiments herein include a technique of utilizing accessed portions of the repository to identify a name information, status information, icon type information, etc. associated with a respective child resource entry (e.g., sub-resources A1, A2, A3, . . . ) to be displayed as an expanded portion 350 of the hierarchical tree 160.

In one embodiment, the object data stored in repository 180 includes much more information than merely how a respective sub-resource will be displayed in a respective hierarchical tree 160 of storage area network resources. For example, a managed object in repository 180 can include all of the configuration information associated with a respective storage area network resource. Only a portion of each managed object in repository 180 is needed to expand the hierarchical tree 160.

Figure 3:
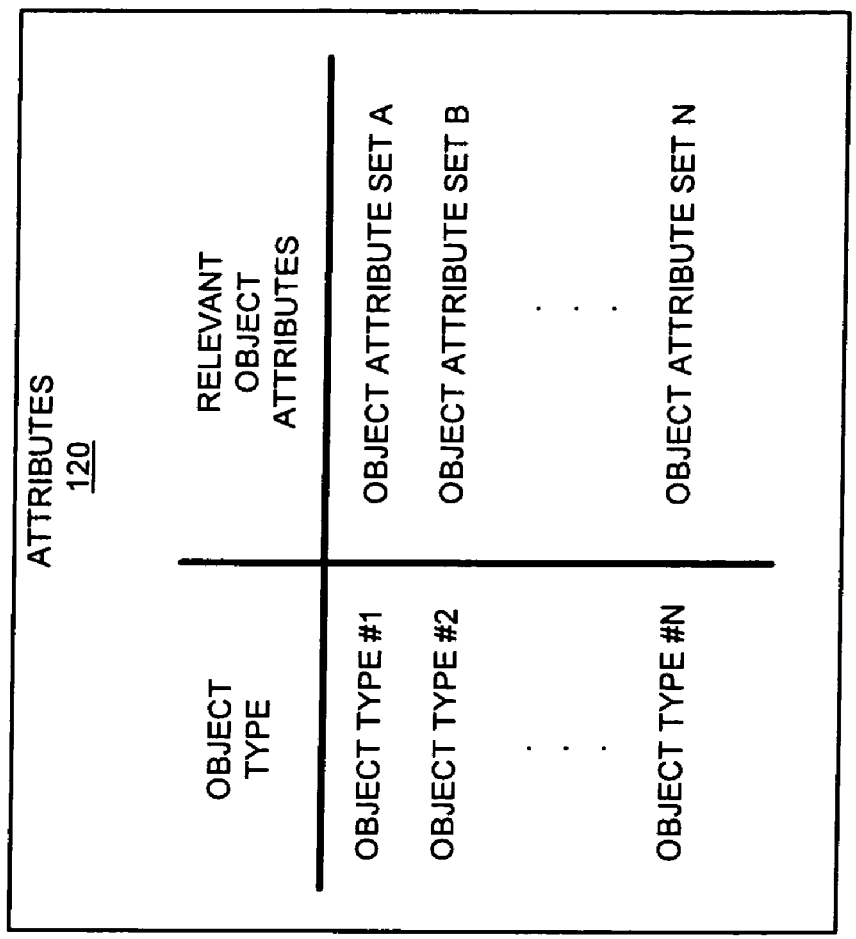
FIG. 3 is a diagram of a hierarchical tree before and after execution of an expansion function according to an embodiment herein.

FIG. 3 is a diagram illustrating a mapping of object types to corresponding object attributes according to an embodiment herein. To identify attributes associated with a specific managed object having corresponding object data to be retrieved from repository 180, the display manager 140 maps an object type (which depends on a corresponding type of resource the object represents) to a corresponding attribute set to be used for retrieving only a sub-portion of data associated with the object. For example, suppose that RESOURCE A in the hierarchical tree 160 of FIG. 2 represents a Symmetrix™ storage system. The repository 180 includes an object defining the Symmetrix storage system and related sub-resources. In this example, assume that the sub-resources associated with RESOURCE A include Symmetrix™ storage devices. In such a case, the repository 180 would also include a corresponding managed object defining a configuration of each sub-resource and how the resource fits in with the storage area network environment.

To update the hierarchical tree 160 to include the sub-resources (i.e., Symmetrix™ devices) after receiving a tree expansion command from a user, the display manager 140 utilizes a type (e.g., Symmetrix™ devices) associated with the sub-resources to identify specific attributes of object data to be retrieved from the corresponding objects (associated with the Symmetrix™ storage devices) in repository 180. In one embodiment, the objects defining the Symmetrix™ storage devices (or any other type of resource) are based on a standard data structure for such a type of resource. Because the resources represented by the respective objects for a same type of resource are unique, the object data in the data structure is populated differently depending on the corresponding resource the object defines. Accordingly, when the display manager 140 must update the hierarchical tree 160 in response to receiving a tree expansion command, the display manager 140 can identify a type associated with the objects to be accessed and identify attributes or specific portions of object data to be retrieved from repository 180 for updating the hierarchical tree 160.

Figure 4:
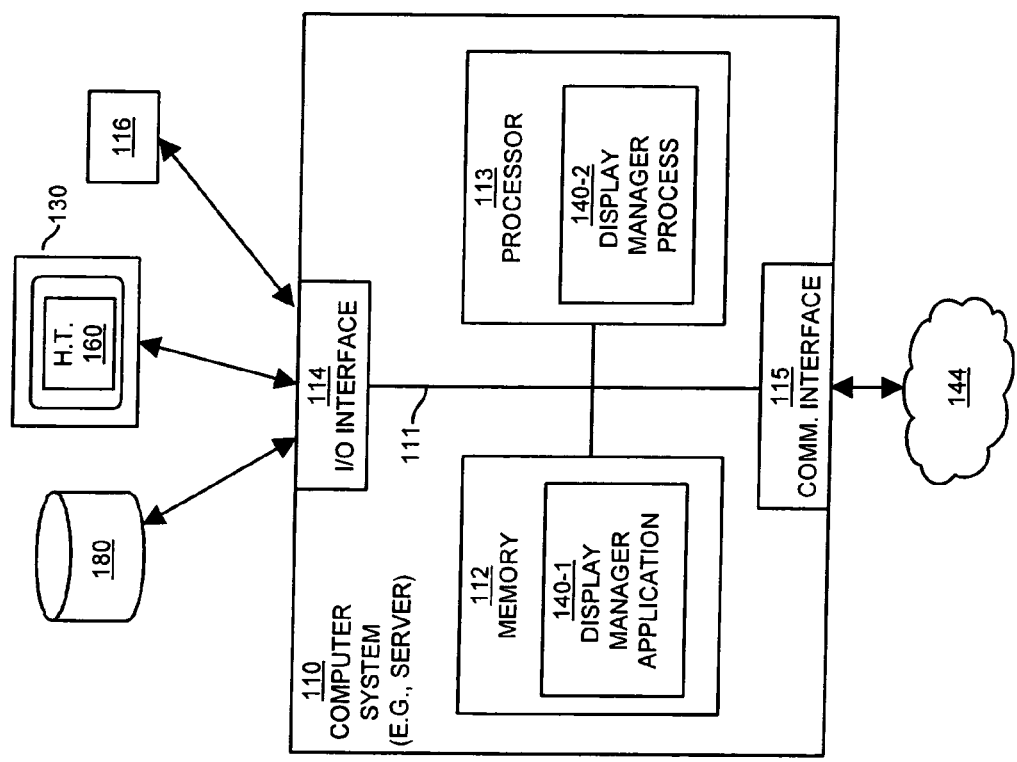
FIG. 4 is a diagram of a processing device suitable for generating a set of operational instructions for updating a hierarchical tree according to an embodiment herein.

FIG. 4 is a block diagram illustrating an example computer system 110 for executing display manager application 140 according to embodiments herein. Computer system 110 may be a computerized device such as a personal computer, workstation, portable computing device, console, network terminal, processing device, etc.

As shown, computer system 110 of the present example includes an interconnect 111 that couples a memory system 112, a processor 113, I/O interface 114, and a communications interface 115. Peripheral devices 116 (e.g., one or more optional user controlled devices such as a keyboard, mouse, display screens, etc.) couple to processor 113 through I/O interface 114. Communications interface 115 of computer system 110 enables computer system 110 to communicate over network 144 to transmit and receive information from different resources.

As shown, memory system 112 is encoded with display manager application 140-1 supporting generation of display information 145 to produce hierarchical tree 160 on display screen 130. Display manager application 140-1 may be embodied as software code such as data and/or logic instructions (e.g., code stored in the memory or on another computer readable medium such as a disk) that support processing functionality according to different embodiments described herein. During operation, processor 113 accesses memory system 112 via the interconnect 111 in order to launch, run, execute, interpret or otherwise perform the logic instructions of the display manager application 140-1. Execution of display manager application 140-1 produces processing functionality in display manager process 140-2. In other words, the display manager process 140-2 represents one or more portions of the display manager application 140-1 (or the entire application) performing within or upon the processor 113 in the computer system 110.

It should be noted that display manager 140 (in FIG. 1) executed in computer system 110 can be represented by either one or both of the display manager application 140-1 and/or the display manager process 140-2. For purposes of this discussion and different embodiments of the invention, general reference will again be made to the an entity such as display manager 140 as performing or supporting the various steps and functional operations as previously discussed and as will be discussed further in this specification.

It should be noted that, in addition to the display manager process 140-2, embodiments herein include the display manager application 140-1 itself (i.e., the un-executed or non-performing logic instructions and/or data). The display manager application 140-1 may be stored on a computer readable medium such as a floppy disk, hard disk or in an optical medium. The display manager application 140-1 may also be stored in a memory type system such as in firmware, read only memory (ROM), or, as in this example, as executable code within the memory system 112 (e.g., within Random Access Memory or RAM). In addition to these embodiments, it should also be noted that other embodiments herein include the execution of display manager application 140-1 in processor 113 as the display manager process 140-2. Thus, those skilled in the art will understand that the computer system 110 may include other processes and/or software and hardware components, such as an operating system that controls allocation and use of hardware resources.

Functionality supported by computer system 110 and, more particularly, display manager 140 will now be discussed via flowcharts in FIGS. 5 and 6. For purposes of this discussion, computer system 110 generally performs steps in the flowcharts. This functionality can be extended to the other entities as well. Note that there will be some overlap with respect to concepts discussed above. Also, note that the steps in the below flowcharts need not always be executed in the order shown.

Figure 5:
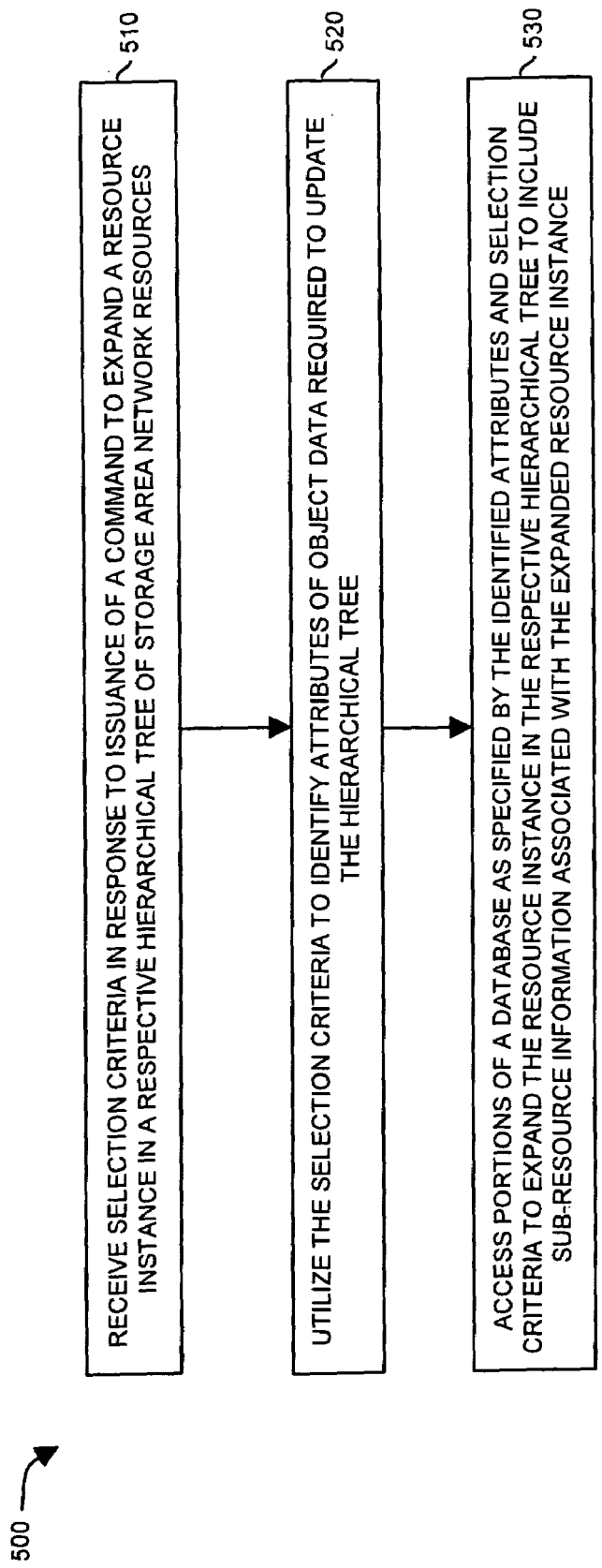
FIG. 5 is a flowchart illustrating a technique facilitating management of object data according to an embodiment herein.

Now, more particularly, FIG. 5 is a flowchart 500 illustrating a technique of expanding portions of a hierarchical tree 160 as discussed above.

In step 510, the display manager 140 receives selection criteria in response to issuance of a user command to expand a resource instance in a respective hierarchical tree 160 of storage area network resources.

In step 520, the display manager 140 utilizes the selection criteria received from a respective query object 115 to identify corresponding attributes 120 of object data in repository 180 required to update the hierarchical tree 160.

In step 530, the display manager 140 accesses portions of repository 180 (e.g., a database) as specified by the identified attributes 120 and selection criteria to expand the resource instance in the respective hierarchical tree 160 to include sub-resource information associated with the expanded resource instance.

Figure 6:
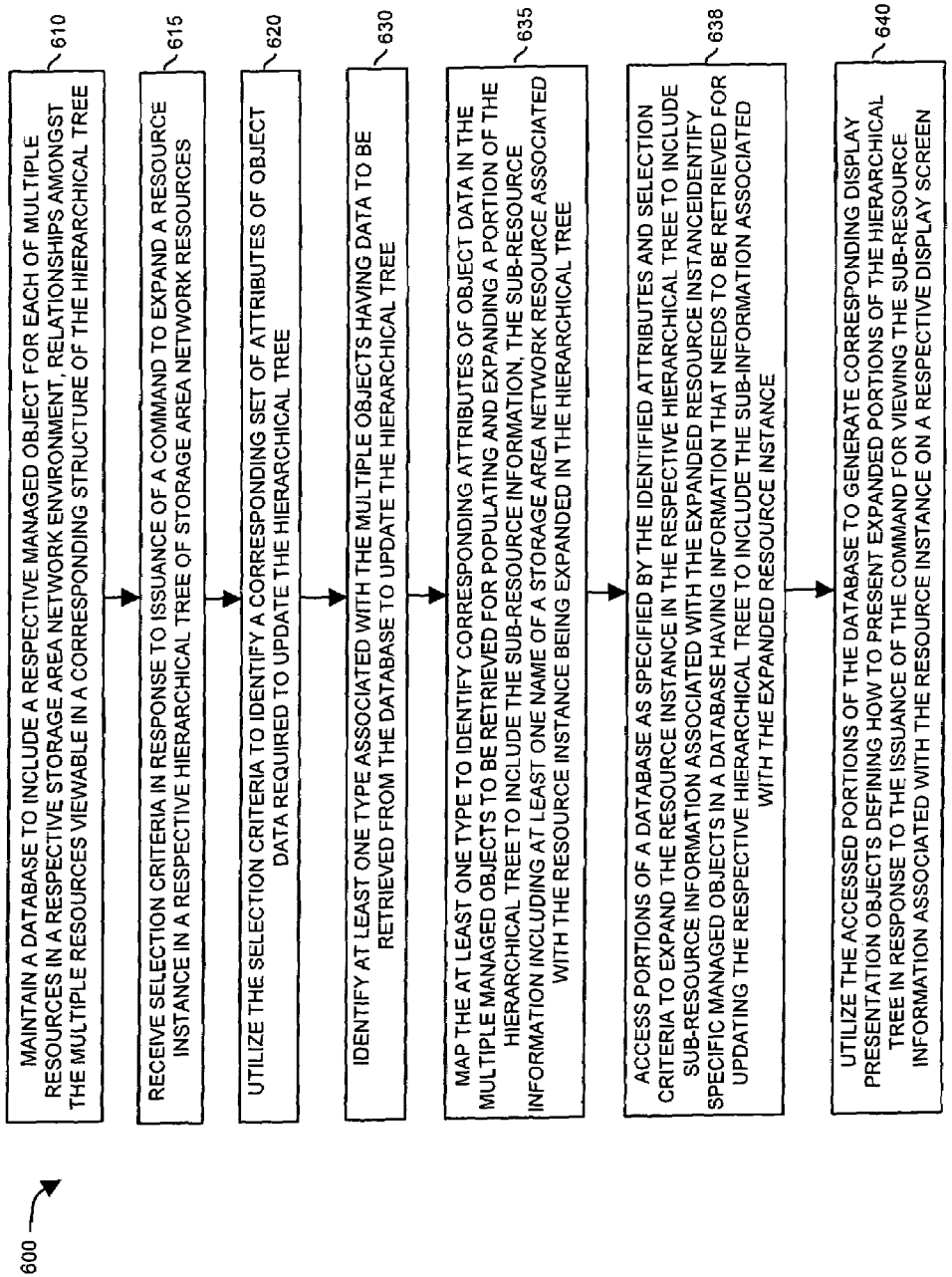
FIG. 6 is a more detailed flowchart illustrating a technique of managing presentation of a hierarchical tree according to embodiments herein.

FIG. 6 is a flowchart 600 illustrating a technique of managing display of hierarchical tree 160 according to embodiments herein.

In step 610, computer system 110 maintains a database to include a respective managed object for each of multiple resources in a respective storage area network environment. As discussed, relationships amongst the multiple storage area network resources are viewable in a corresponding structure of a hierarchical tree 160.

In step 615, display manager 140 of computer system 110 receives selection criteria from a triggered query object in response to issuance of a command to expand a resource instance in a respective hierarchical tree 160 of storage area network resources.

In step 620, display manager 140 utilizes the selection criteria received from the query object to identify specific managed objects in a repository 180 (e.g., database) having at least a portion of information that needs to be retrieved for updating the respective hierarchical tree 160 to expand a selected resource instance.

In step 630, the display manager 140 identifies at least one type associated with the multiple objects having data to be retrieved form repository 180 to update the hierarchical tree.

In step 635, display manager 140 utilizes attributes 120 to map the one or more types to identify corresponding attributes of object data in the identified managed objects for retrieval and updating of the hierarchical tree 160.

In step 638, display manager 140 initiates accessing portions of data in repository 180 as specified by the attributes and selection criteria for purposes of expanding a resource instance in the hierarchical tree to include sub-resource information associated with the expanded resource identifies one or more types associated with the identified objects having data to be retrieved from the repository 180.

In step 640, display manager 140 utilizes the accessed portions of object data to generate corresponding display information (e.g., display presentation objects) indicating how to present expanded portions of the hierarchical tree 160 in response to the issuance of the hierarchical tree expansion command by a respective user.

Figure 7:
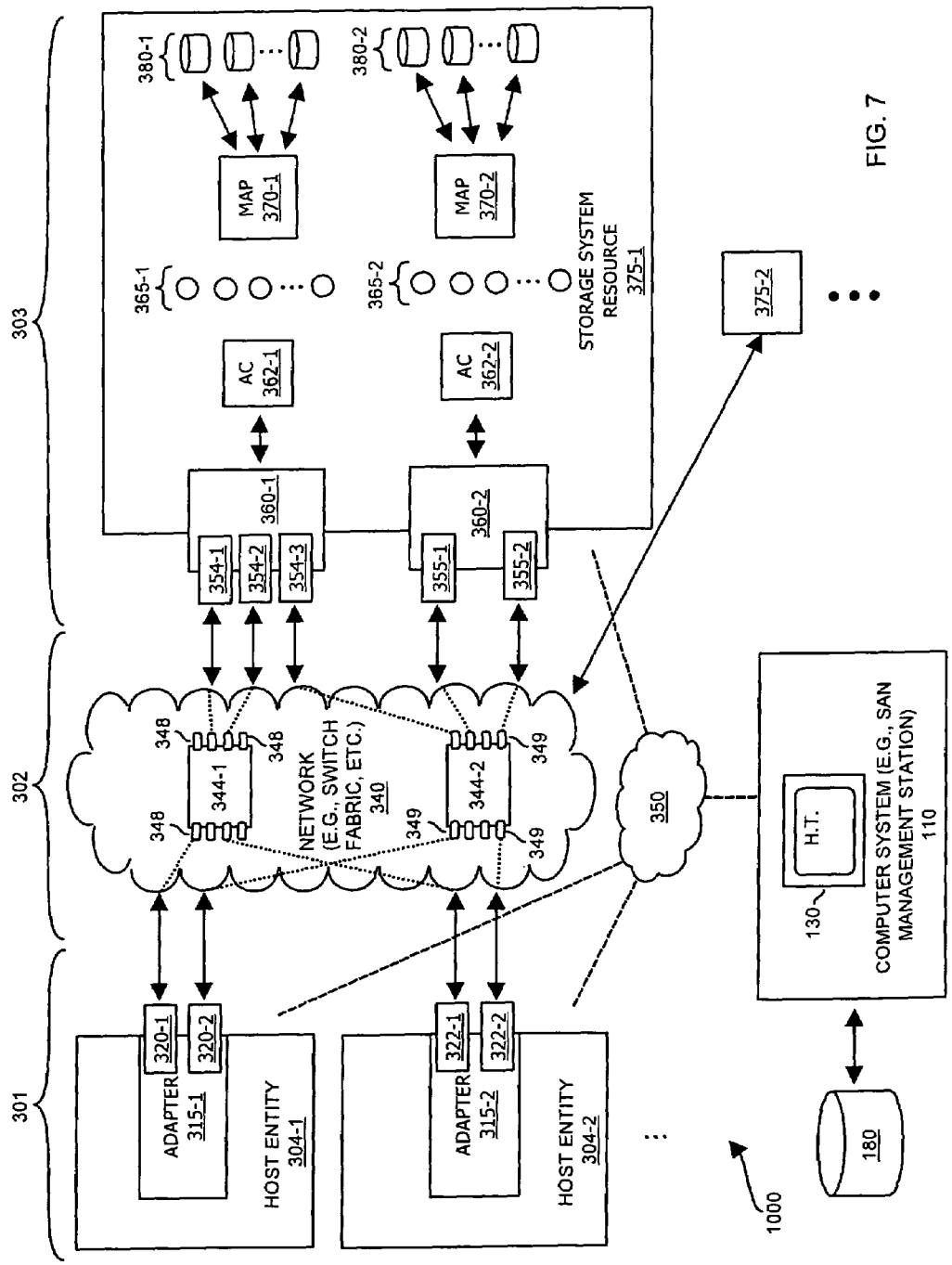
FIG. 7 is a diagram of an example storage area network environment having respective resources represented by entries in a corresponding hierarchical tree according to embodiments herein.

FIG. 7 is a block diagram more particularly illustrating connectivity of example network resources (e.g., host resources 301, switch resources 302, and storage resources 303) in a storage area network environment 1000. As shown, storage area network environment 1000 includes host entity 304-1, host entity 304-2, . . . (collectively, host entities 304), network 340 (e.g., a high speed fiber-based switch fabric), network 350 (e.g., LAN, WAN, Internet, intranet, etc.), storage system resource 375-1, storage system resource 375-2, computer system 110, and database 180. Network 340 includes switch device 344-1, switch device 344-2, and corresponding switch ports 348 and 349. Host entity 304-1 includes adapter 315-1. Adapter 315-1 (e.g., host bus adapter) has a corresponding port 320-1 and port 320-2 to communicate (e.g., via a fiber link) over network 340. Host entity 304-2 includes adapter 315-2. Adapter 315-2 has corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2. A convenient way to view and manage these and other resources in the storage area network environment includes displaying hierarchical tree 160 on a respective display screen 130 as discussed above.

In general, network 340 and related resources enable host entities 304 (e.g., clients, host computers, etc.) to access data in storage system resources 375. As an example, host entity 304-1 couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375. Thus, switch devices 344 and corresponding ports 348 and 349 form at least part of a connection path between host entities 304 and corresponding storage system resources 375.

Storage system resource 375-1 (e.g., a storage system) includes access controllers 362 to facilitate access to corresponding storage devices 365 (e.g., logical storage space or devices). Storage devices 365 are configured as logical portions of one or more physical storage devices 380 (e.g., arrays of one or more storage disks or portions thereof). Maps 370 provide a mapping of storage devices 365 (e.g., logical volumes) to corresponding physical storage devices 380 (e.g., storage disks).

Each host entity 304 may be limited to accessing certain storage devices 365 in storage system resource 375-1 based at least in part on configuration settings of switch devices 344 of network 340. Computer system 110 enables a user to modify a configuration of the storage area network. For example, in one embodiment, computer system 110 enables a user such as a network administrator to initiate application of display manager 140 to view a hierarchical tree 160 of storage area network resource and implement changes to a corresponding storage area network configuration. The hierarchical tree 160 enables a respective user to quickly identify particular resources and thereafter view further information associated with the resources in a separate portion of display screen other than that used to display the hierarchical tree 160. Accordingly, in one embodiment, the user can select one or more resources in the hierarchical tree 160 in a first region of display screen 130 for purposes of viewing more specific configuration details of the selected one or more resources in a second region of the display screen 130.

As discussed above, techniques herein are well suited for use in environments enabling initiation of commands on objects and/or object hierarchies having respective object data stored in a relational database. However, it should be noted that embodiments herein are not limited to use in such applications.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
receiving selection criteria in response to issuance of a command to expand a resource instance in a hierarchical tree of storage area network resources, the selection criteria indicating identities of multiple managed objects that store information associated with sub-resources in the hierarchical tree beneath the resource instance being expanded;
identifying a resource type associated with the sub-resources beneath the resource instance being expanded;
mapping the identified resource type to attribute information indicating attributes of object data in the multiple managed objects;
accessing portions of the multiple managed objects as specified by the attributes to expand the resource instance in the respective hierarchical tree to include a representation of the sub-resources;
maintaining each of the multiple managed objects to include configuration information associated with the sub-resources as well as display information associated with the sub-resources for creating an expanded version of the hierarchical tree;
identifying relevant portions of the multiple managed objects to be retrieved based on the attribute information, the relevant portions indicating the display information associated with the sub-resources as opposed to the configuration information associated with the sub-resources; and
initialing expansion of the hierarchical tree based on retrieving the relevant portions of the multiple managed objects in lieu of retrieving the configuration information associated with each of the multiple managed objects.

2. A method as in claim 1 further comprising:
utilizing the accessed portions of the multiple managed objects to generate corresponding display presentation objects defining how to present the representation of the sub-resources beneath the resource instance in the hierarchical tree in response to the issuance of the command for expanding the resource instance on a respective display screen.

3. A method as in claim 1 further comprising:
maintaining a database to include a respective managed object for each of multiple resources in a respective storage area network environment, relationships amongst the multiple resources represented by a corresponding structure of the hierarchical tree.

4. A method as in claim 3, wherein receiving the selection criteria includes communicating with a processing function, which is triggered by the issuance of the command, to identify the multiple managed objects, the method further comprising:
utilizing the accessed portions of the multiple managed objects to generate corresponding display presentation objects defining how to present the representation of the sub-resources beneath the resource instance in the hierarchical tree in response to the issuance of the command.

5. A method as in claim 1, wherein receiving the selection criteria and the issuance of the command occurs in response to a respective user at a display screen clicking on the hierarchical tree to view child resource entries of corresponding storage area network resources associated with the resource instance, the resource instance being a selected parent resource entry to be expanded in the hierarchical tree.

6. A method as in claim 5 further comprising:
utilizing the accessed portions of the multiple managed objects to identify at least one of a name, status, and icon type associated with the sub-resources to be displayed as an expanded portion of the hierarchical tree.

7. A method as in claim 1, wherein receiving the selection criteria includes receiving an identity of multiple objects in the database associated with corresponding multiple storage area network resources to be listed in an expanded portion of the hierarchical tree, the method further comprising:
identifying at least one type associated with the multiple objects; and
mapping the at least one type to identify corresponding attributes of object data in the multiple managed objects to be retrieved for populating and expanding a portion of the hierarchical tree to include the sub-resource information, the sub-resource information including at least one name of a storage area network resource associated with the resource instance.

8. A method as in claim 1 further comprising:
receiving a query from a query object triggered in response to the issuance of the command to expand the resource instance in the respective hierarchical tree;
accessing information from a database on behalf of the query object; and
forwarding the accessed information to the query object for purposes of enabling the query object to examine the accessed information.

9. A method as in claim 8, wherein forwarding the accessed information includes forwarding a list of attributes retrieved from the database to the query object for purposes of enabling the query object to compute volume access rights for a respective device in a storage area network environment.

10. The method as in claim 9 further comprising:
utilizing computed volume access rights to decide whether to display or prevent displaying the respective device as a sub-resource in an expanded portion of the hierarchical tree.

11. The method as in claim 1 further comprising:
maintaining a map of multiple object types and corresponding relevant object attributes associated with each of the multiple object types; and
utilizing the map to identify relevant portions of managed objects to retrieve to expand the hierarchical tree.

12. A computer system that facilitates management of objects in an object-oriented environment, the computer system comprising:
a processor;
a memory unit that stores instructions associated with an application executed by the processor; and
an interconnect coupling the processor and the memory unit, enabling the computer system to execute the application and perform operations of:
receiving selection criteria in response to issuance of a command to expand a resource instance in a hierarchical tree of storage area network resources, the selection criteria indicating identities of multiple managed objects that store information associated with sub-resources in the hierarchical tree beneath the resource instance being expanded;
identifying a resource type associated with the sub-resources beneath the resource instance being expanded;
mapping the identified resource type to attribute information indicating attributes of object data in the multiple managed objects;
accessing portions of the multiple managed objects as specified by the attributes to expand the resource instance in the respective hierarchical tree to include a representation of the sub-resources;
maintaining each of the multiple managed objects to include configuration information associated with the sub-resources as well as display information associated with the sub-resources for creating an expanded version of the hierarchical tree;
identifying relevant portions of the multiple managed objects to be retrieved based on the attribute information, the relevant portions indicating the display information associated with the sub-resources as opposed to the configuration information associated with the sub-resources; and
initiating expansion of the hierarchical tree based on retrieving the relevant portions of the multiple managed objects in lieu of retrieving the configuration information associated with each of the multiple managed objects.

13. A computer system as in claim 12 further supporting operations of:
utilizing the accessed portions of the database to generate corresponding display presentation objects defining how to present expanded portions of the hierarchical tree in response to the issuance of the command for viewing the sub-resource information associated with the resource instance on a respective display screen.

14. A computer system as in claim 12 further supporting operations of:
maintaining a database to include a respective managed object for each of multiple resources in a respective storage area network environment, relationships amongst the multiple resources represented by a corresponding structure of the hierarchical tree.

15. A computer system as in claim 12, wherein receiving the selection criteria and the issuance of the command occurs in response to a respective user at a display screen clicking on the hierarchical tree to view child resource entries of corresponding storage area network resources associated with the resource instance, the resource instance being a selected parent resource entry to be expanded in the hierarchical tree.

16. A computer system as in claim 15 further supporting operations of:
utilizing the accessed portions of the database to identify at least one of a name, status, and icon type associated with a respective child resource entry to be displayed as an expanded portion of the hierarchical tree.

17. A computer system as in claim 12 further supporting operations of:
receiving a query from a query object triggered in response to the issuance of the command to expand the resource instance in the respective hierarchical tree;
accessing information from the database on behalf of the query object; and
forwarding the accessed information to the query object for purposes of enabling the query object to examine the accessed information.

18. A computer system as in claim 17, wherein forwarding the accessed information includes forwarding a list of attributes retrieved from the database to the query object for purposes of enabling the query object to compute volume access rights for a respective device in a storage area network environment.

19. A computer program product including a computer-readable medium having instructions stored thereon for processing data information, such that the instructions, when carried out by a processing device, enable the processing device to perform the steps of:
receiving selection criteria in response to issuance of a command to expand a resource instance in a hierarchical tree of storage area network resources, the selection criteria indicating identities of multiple managed objects that store information associated with sub-resources in the hierarchical tree beneath the resource instance being expanded;
identifying a resource type associated with the sub-resources beneath the resource instance being expanded;
mapping the identified resource type to attribute information indicating attributes of object data in the multiple managed objects; and
accessing portions of the multiple managed objects as specified by the attributes to expand the resource instance in the respective hierarchical tree to include a representation of the sub-resources;
maintaining each of the multiple managed objects to include configuration information associated with the sub-resources as well as display information associated with the sub-resources for creating an expanded version of the hierarchical tree;
identifying relevant portions of the multiple managed objects to be retrieved based on the attribute information, the relevant portions indicated the display information associated with the sub-resources as opposed to the configuration information associated with the sub-resources; and
initiating expansion of the hierarchical tree based on retrieving the relevant portions of the multiple managed objects in lieu of retrieving the configuration information associated with each of the multiple managed objects.

* * * * *